US010545266B2

(12) United States Patent
Li

(10) Patent No.: US 10,545,266 B2
(45) Date of Patent: *Jan. 28, 2020

(54) DISPLAY DEVICE, LENS FILM AND DISPLAY METHOD

(71) Applicant: Beijing Xiaomi Mobile Software Co., Ltd., Haidian District, Beijing (CN)

(72) Inventor: Guosheng Li, Beijing (CN)

(73) Assignee: BEIJING XIAMOI MOBILE SOFTWARE CO., LTD., Beijing (CN)

(*) Notice: Subject to any disclaimer, the term of this patent is extended or adjusted under 35 U.S.C. 154(b) by 58 days.

This patent is subject to a terminal disclaimer.

(21) Appl. No.: 15/820,463

(22) Filed: Nov. 22, 2017

(65) Prior Publication Data
US 2018/0143354 A1 May 24, 2018

(30) Foreign Application Priority Data
Nov. 22, 2016 (CN) .......................... 2016 1 1050262

(51) Int. Cl.
G02B 3/00 (2006.01)
G09G 3/00 (2006.01)

(52) U.S. Cl.
CPC .............. G02B 3/005 (2013.01); G09G 3/003 (2013.01); G09G 2354/00 (2013.01); G09G 2358/00 (2013.01)

(58) Field of Classification Search
CPC .......... G09G 2300/0443; G09G 3/003; G09G 2354/00; G09G 2358/00; G09G 3/20; G09G 2320/028; G09G 2320/068
See application file for complete search history.

(56) References Cited

U.S. PATENT DOCUMENTS 5,933,228 A 8/1999 Taylor et al.
2008/0211825 A1* 9/2008 Sunakawa ............ G06F 3/1446
345/581

(Continued)

FOREIGN PATENT DOCUMENTS

CN 101946272 A 1/2011
CN 102222492 A 10/2011

(Continued)

OTHER PUBLICATIONS

Extended European search report of European Patent Application No. 17202861.5, from the European Patent office, dated May 4, 2018.

(Continued)

Primary Examiner — Md Saiful A Siddiqui
(74) Attorney, Agent, or Firm — Jun He Law Offices P.C.; James J. Zhu

(57) ABSTRACT

A display device includes a controller, a display driver coupled to the controller, a display panel coupled to the display driver, and a lens film disposed over the display panel. The lens film includes a plurality of elongated lenses arranged in parallel with each other, each of the plurality of elongated lenses having a refractive index. The controller is configured to send an image frame to the display driver. The display driver is configured to drive the display panel to display the image frame in a plurality of display areas of the display panel arranged in parallel with each other and spaced apart from each other, each of the plurality of display areas being configured to display a portion of a display content of the image frame. The display content displayed in the plurality of display areas, after refracted by respective ones of the plurality of elongated lenses, is projected to a predetermined visible range.

12 Claims, 6 Drawing Sheets

(56) References Cited

U.S. PATENT DOCUMENTS

| | | | |
|---|---|---|---|
| 2009/0146915 A1* | 6/2009 | Marathe | G06F 3/1438 345/7 |
| 2009/0167846 A1* | 7/2009 | Niioka | G02B 27/2214 348/54 |
| 2010/0309204 A1* | 12/2010 | Smith | G02B 27/2214 345/419 |
| 2011/0018860 A1* | 1/2011 | Parry-Jones | G09G 3/20 345/214 |
| 2015/0138457 A1 | 5/2015 | Kroon | |
| 2016/0019868 A1* | 1/2016 | Park | G09G 5/391 345/428 |
| 2016/0323570 A1* | 11/2016 | Kim | H04N 13/31 |
| 2018/0063502 A1* | 3/2018 | Ogawa | H04N 13/167 |

FOREIGN PATENT DOCUMENTS

| | | |
|---|---|---|
| CN | 103444187 A | 12/2013 |
| CN | 205176423 U | 4/2016 |
| DE | 19519417 A1 | 11/1996 |
| JP | 2006301146 A | 11/2006 |
| WO | 2013002804 A1 | 1/2013 |

OTHER PUBLICATIONS

First Office Action issued in corresponding Chinese Application No. 201611050262.4, dated May 2, 2018.

The First Office Action in European Patent Application No. 17202861.5, dated Mar. 19, 2019.

* cited by examiner

LENS FILM 162    DISPLAY PANEL 144

DISPLAY DEVICE, LENS FILM AND DISPLAY METHOD

CROSS-REFERENCE TO RELATED APPLICATION

This application is based upon and claims priority to Chinese patent application No. 201611050262.4, filed Nov. 22, 2016, which is incorporated herein by reference in its entirety.

TECHNICAL FIELD

The present disclosure relates to the technical field of image display, and more particularly, to a display device, a lens film and a display method.

BACKGROUND

A display screen is one of the most common input and output devices for electronic equipment. The display screen has a capability of displaying texts, images and videos.

Currently, the display screen usually has a wide visible angle approximately in a range of 120° to 170°. When a user uses electronic equipment in a densely populated place such as a bus and a subway, it is probable that other persons around the user may catch sight of the contents on the display screen, resulting in privacy leakage for the user.

SUMMARY

In order to solve the problem that when the display screen is a wide visible angle display screen, it is probable that other persons around the user may catch sight of the contents on the display screen, resulting in privacy leakage for the user, embodiments of the present disclosure provide a display device, a lens film and a display method, the display device having a narrower visible angle. Technical solutions are as follows.

According to a first aspect of the embodiments of the present disclosure, a display device is provided and includes: a controller; a display driver coupled to the controller; a display panel coupled to the display driver; and a lens film disposed over the display panel; wherein the lens film comprises a plurality of elongated lenses arranged in parallel with each other, each of the plurality of elongated lenses having a refractive index; wherein the controller is configured to send an image frame to the display driver; and wherein the display driver is configured to drive the display panel to display the image frame in a plurality of display areas of the display panel arranged in parallel with each other and spaced apart from each other, each of the plurality of display areas being configured to display a portion of a display content of the image frame; and wherein the display content displayed in the plurality of display areas, after refracted by respective ones of the plurality of elongated lenses, is projected to a predetermined visible range.

According to a second aspect of the embodiments of the present disclosure, a lens film is provided and includes: a plurality of elongated lenses arranged in parallel with each other, each having a bottom surface being flat and a top surface being semi-cylindrical; wherein each of the plurality of elongated lenses has a respective refractive index and is configured to refract light from its bottom surface to a predetermined visible range through its top surface.

According to a third aspect of the embodiments of the present disclosure, a display method, applied to a display device including a controller, a display driver coupled to the controller, a display panel coupled to the display driver, and a lens film disposed over the display panel, the lens film comprising a plurality of elongated lenses arranged in parallel with each other, and each of the plurality of elongated lenses having a refractive index, the display method comprising: sending an image frame to the display driver by the controller; driving the display panel to display the image frame in a plurality of display areas arranged in parallel and spaced apart from each other by the display driver, each of the plurality of display areas displaying a portion of a display content of the image frame, wherein the display content displayed in the plurality of display areas, after refracted by respective ones of the plurality of elongated lenses, is projected to a predetermined visible range.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of apparatuses and methods consistent with aspects related to the disclosure as recited in the appended claims.

The embodiments of the present disclosure are intended to provide a display device, a lens film and a display method, the display device having a narrower visible angle. Optionally, the display device has a wide visible angle mode and a narrow visible angle mode and can switch between the two modes. Here, the display device may be any electronic equipment having a display screen, such as a mobile phone, a tablet.

Figure 1:
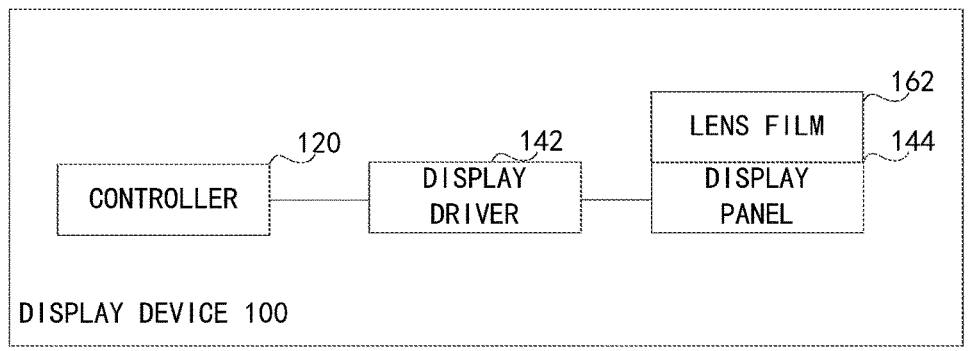
FIG. 1 is a block diagram illustrating a display device according to an exemplary embodiment.

FIG. 1 is a block diagram illustrating a display device 100 according to an exemplary embodiment.

As illustrated in FIG. 1, the display device 100 includes: a controller 120, a display driver 142 coupled to the control 120, a display panel 144 coupled to the display driver 142, and a lens film 162 disposed over the display panel 144. The lens film 162 includes a plurality of lenses 163 arranged in parallel with each other, each of the lenses 163 having a respective refractive index.

The controller 120 may be a processor or a graphics processor. The controller 120 has a capability of outputting an image frame and sending a control instruction.

The display driver 142 includes a driving circuit and is configured to drive the display panel 144 to perform a display. The display panel 144 may be a liquid crystal display (LCD) panel or an organic light-emitting display (OLED) panel. Optionally, when the display panel 144 is a LCD panel, the display device 100 also includes a backlight source below the LCD panel.

Figure 2:
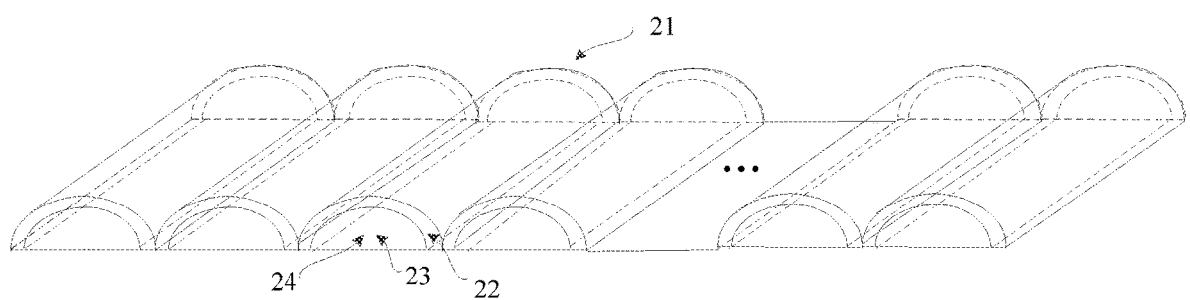
FIG. 2 is a schematic structural diagram of a lens film 20 according to an exemplary embodiment.

FIG. 2 is a schematic structural diagram of a lens film 20 according to an exemplary embodiment.

As illustrated in FIG. 2, the lens film 20 includes a plurality of elongated lenses 21 arranged in parallel with each other. A bottom surface of each of the lenses 21 is a flat surface and a top surface thereof is a semi-cylindrical surface. Optionally, the bottom surface of the lens 21 is shaped as a rectangle, a length of a longer side of the rectangle is equal to a length of the display panel 144, and a length of a shorter side of the rectangle is 1/N of a width of the display panel 144, where N is the number of the plurality of elongated lenses 21. The longer sides of the rectangular bottom surfaces of each two adjacent elongated lenses 21 are overlapping with each other. The top surface of the elongated lens 21 may be a semi-cylindrical surface, or an arc surface which is a portion of a semi-cylindrical surface, having a radian smaller than that of a semi-cylindrical surface.

Each of the elongated lenses 21 has a respective refractive index and is configured to refract light from the bottom surface to a predetermined visible range through its top surface. Optionally, the predetermined visible range is defined right above the lens film 20, and the width of the predetermined visible range is an empirical value of the width between a pair of human eyes.

Optionally, each of the elongated lenses 21 includes a lens shell 22 and filling material 23. The lens shell 22 defines the bottom surface and the top surface of the elongated lens 21, and a cavity 24 between the bottom surface and the top surface. The filling material 23 is filled in the cavity 24 and the filling material 23 has a refractive index corresponding to that of the elongated lens 21.

Optionally, each of the elongated lenses 21 has a respective refractive index. Some of the elongated lenses 21 have refractive indexes different from each other, and each of the elongated lenses 21 has a refractive index depending on its position relative to the lens film 20.

Optionally, the lens shell 22 is made of plastic or organic glass materials, and the filling material 23 is made of gas, liquid or solid having a predetermined refractive index.

The structure of the lens film 20 in FIG. 2 is a schematic structure, and in practice, the lens film 20 may be designed as a thin film, which is of a shape similar to that of a protective film for a mobile phone screen and is affixed to the upper layer of the display panel 144 with adhesive. That is, the lens film 20 may be produced and sold as a component separate from the display device.

Figure 3:
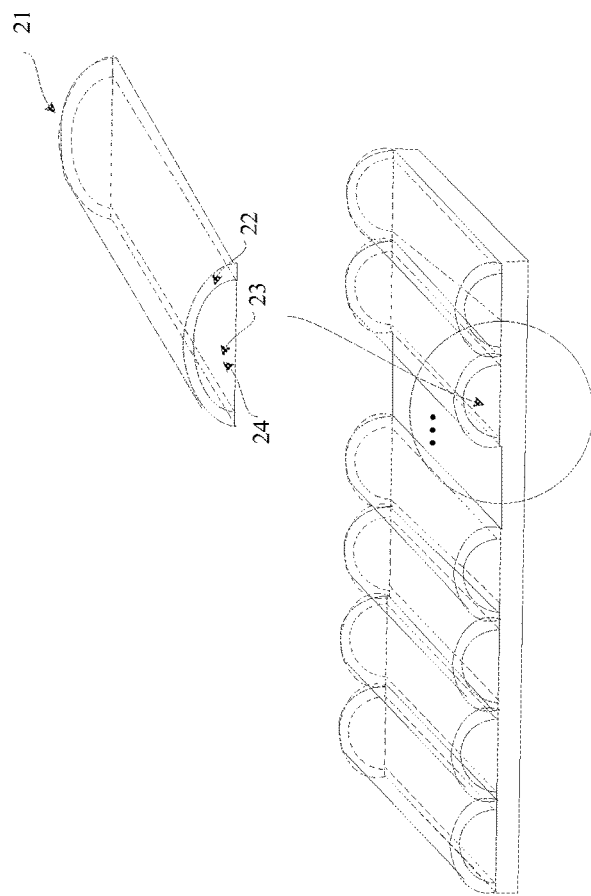
FIG. 3 is a schematic diagram illustrating a lens film 20 affixed onto an upper layer of a display panel 144 according to an exemplary embodiment.
Figure 3:
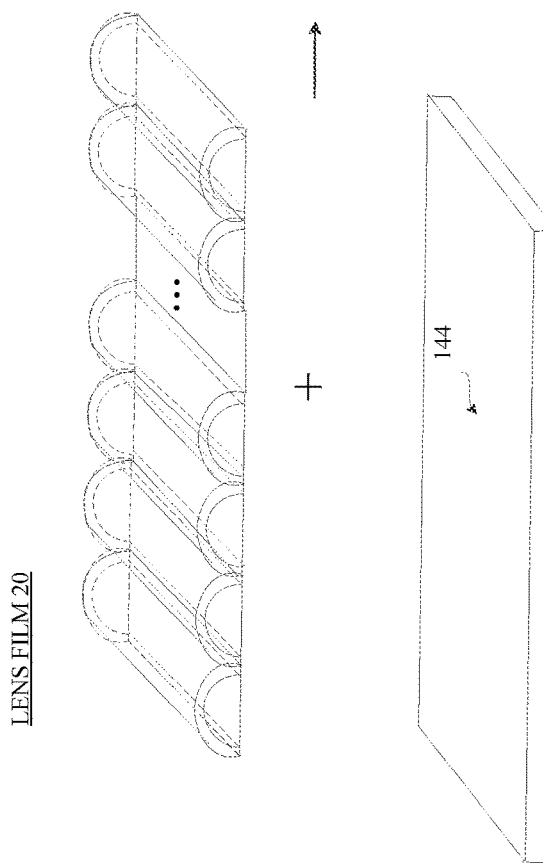

Referring to FIG. 3, schematically, the lens film 20 may be detachably affixed onto the upper layer of the display panel 144.

It should be noted that the size and scale of the lens film 20 and the display panel 144 is exemplary only and can be modified according to actual needs, which is not limited in this embodiment.

Accordingly from the above, in the lens film of the present embodiment, a plurality of elongated lenses are arranged in parallel with each other, the bottom surface of each of the lenses is a flat surface and the top surface is a semi-cylindrical surface; and each of the lenses has a respective refractive index and is configured to refract the light from the bottom surface to a predetermined visible range through the top surface of the lens. When the lens film is detachably affixed onto an upper layer of the display panel, the visible range of the display panel may be limited within a predetermined visible range (i.e., at this time, the operating mode of the display device is a narrow visible angle operating mode). When the lens film is detached from the upper layer of the display panel, the visible range of the display panel is switched to a normal visible range (i.e., at this time, the operating mode of the display device is a wide visible angle operating mode), thereby achieving the effect of meeting various display demands for users in different application scenarios.

Figure 4B:
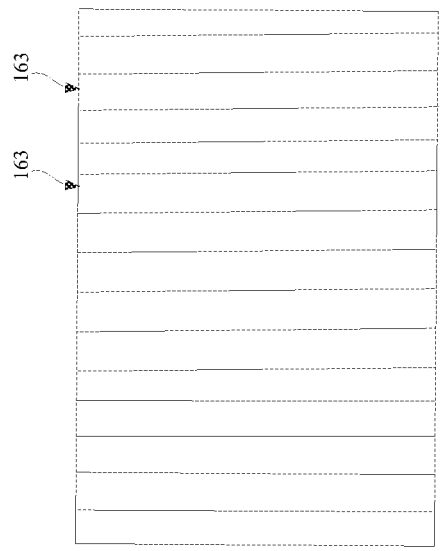
FIGS. 4A to 4C are schematic diagrams illustrating operation of the display device according to the embodiment as shown in FIG. 1.
Figure 4C:
Figure 4A:
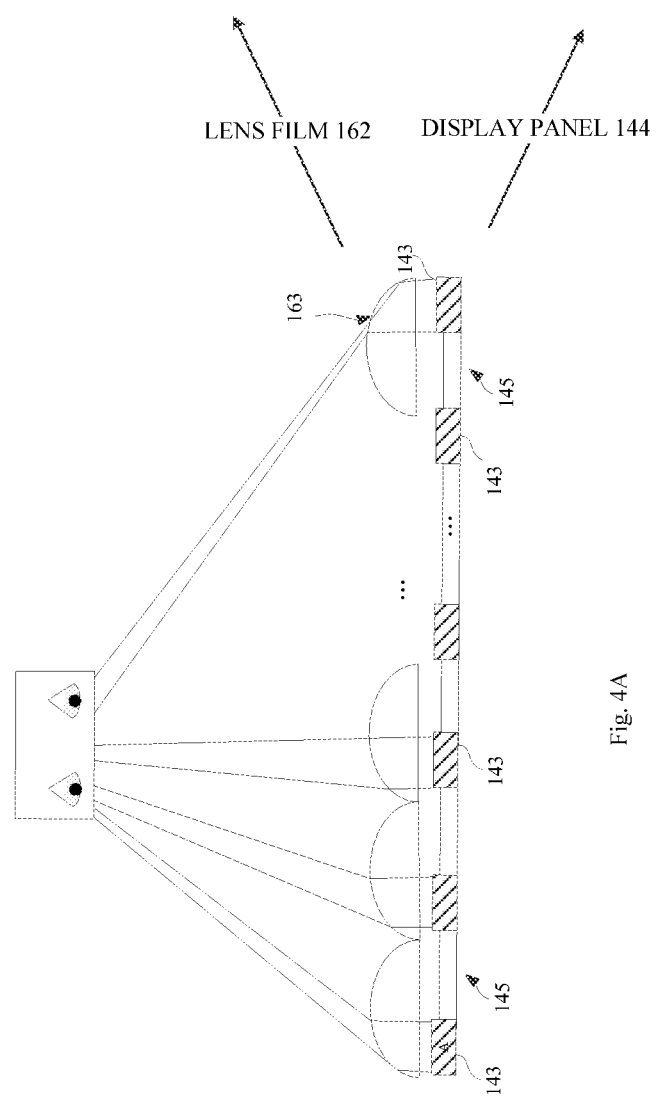

On the basis of the embodiment illustrated in FIG. 1, referring to FIGS. 4A to 4C, which illustrate schematic diagrams of operation when the display panel 144 and the lens film 162 are in the narrow visible angle operating state. FIG. 4A is a schematic side view of the display panel 144 and the lens film 162. The lens film 162 is positioned over the display panel 144. FIG. 4B is a schematic front view of the lens film 162; and FIG. 4C is a schematic front view of the display panel 144.

In the narrow visible angle operating state, the control 120 sends an image frame to the display driver 142.

The display driver 142 is configured to drive the display panel 144 to display the image frame in a plurality of display areas 143 of the display panel 144, which are arranged in parallel with each other and spaced apart from each other. Each of the display areas 143 is configured to display a respective portion of a display content of the image frame. Optionally, if the number of the display areas is N, each of the display areas is configured to display 1/N of the image frame, and the sizes of the portions of the display content displayed in the display areas may be the same as or different from each other. The union of the portions of the display content displayed in all of the display areas 143 is identical to the original entire display content of the image frame.

In other words, the image frame is divided into a plurality of elongated display content portions, the number of the elongated display content portions is equal to that of the display areas, and each of the plurality of elongated display content portions is displayed on respective one of the display areas 143. Each of the display areas 143 is an elongated and rectangular display area. In an embodiment, an idle area 145 between each two adjacent display areas 143 does not display any content of the image frame.

In an embodiment, the display areas 143 are of the same length and width. For example, the length of each of the display areas 143 is 1,080 pixels and the width of each of the display areas 143 is 5 pixels. Also, the width of each of the idle areas 145 between each two adjacent display areas 143 may be the same. For example, the width of each of the idle areas 145 is 3 pixels. In another embodiment, at least two of the display areas 143 have the same length, but have different widths. For example, the width of the display area 143 in a central area of the display panel 144 is larger than the width of the display area 143 in an outer area of the display panel 144. At least two of the idle areas 145 have the same length, but have different widths. For example, the width of the idle area 145 in the central area of the display panel 144 is larger than the width of the idle area 145 in the outer area of the display panel 144. This is not limited in this embodiment of the present disclosure.

The lens film 162 includes a plurality of elongated lenses 163 arranged in parallel with each other, each of the elongated lenses 163 has a respective refractive index.

In an embodiment, each of the elongated lenses 163 has the same length and width. For example, the length of each of the elongated lenses 163 is 1,080 pixels and the width of each of the elongated lenses 163 is 5 pixels. In another embodiment, at least two of the elongated lenses 163 have the same length, but have different widths. For example, the width of the elongated lens 163 in the central area of the lens film 162 is larger than the width of the elongated lens 163 in the outer area of the lens film 162. This is not limited in this embodiment of the present disclosure.

In an embodiment, each of the display areas 143 corresponds to a respective elongated lens 163, i.e., the display areas 143 and the elongated lenses 163 have a one-to-one correspondence.

Figure 4D:
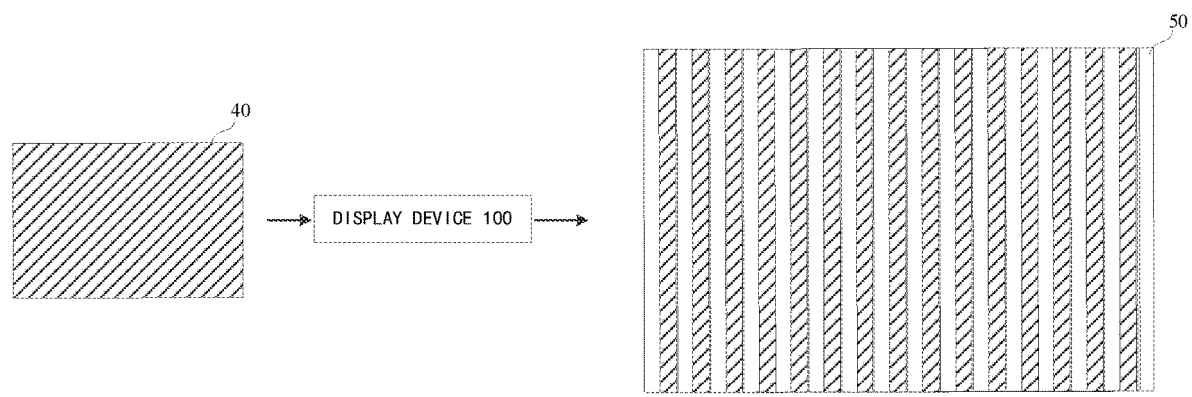
FIG. 4D is a schematic diagram illustrating an effect when an image frame is displayed on the display device according to the embodiment as shown in FIG. 1.

The respective portions of the display content displayed in the display areas 143 are emitted from the display panel and projected to a predetermined visible range after being refracted by the respective elongated lenses 163. That is, in order to be displayed by the display device 100, an image frame 40 may be divided into a plurality of display contents to be displayed, and the front view of the final displayed frame 50 is schematically illustrated in FIG. 4D.

Figure 5:
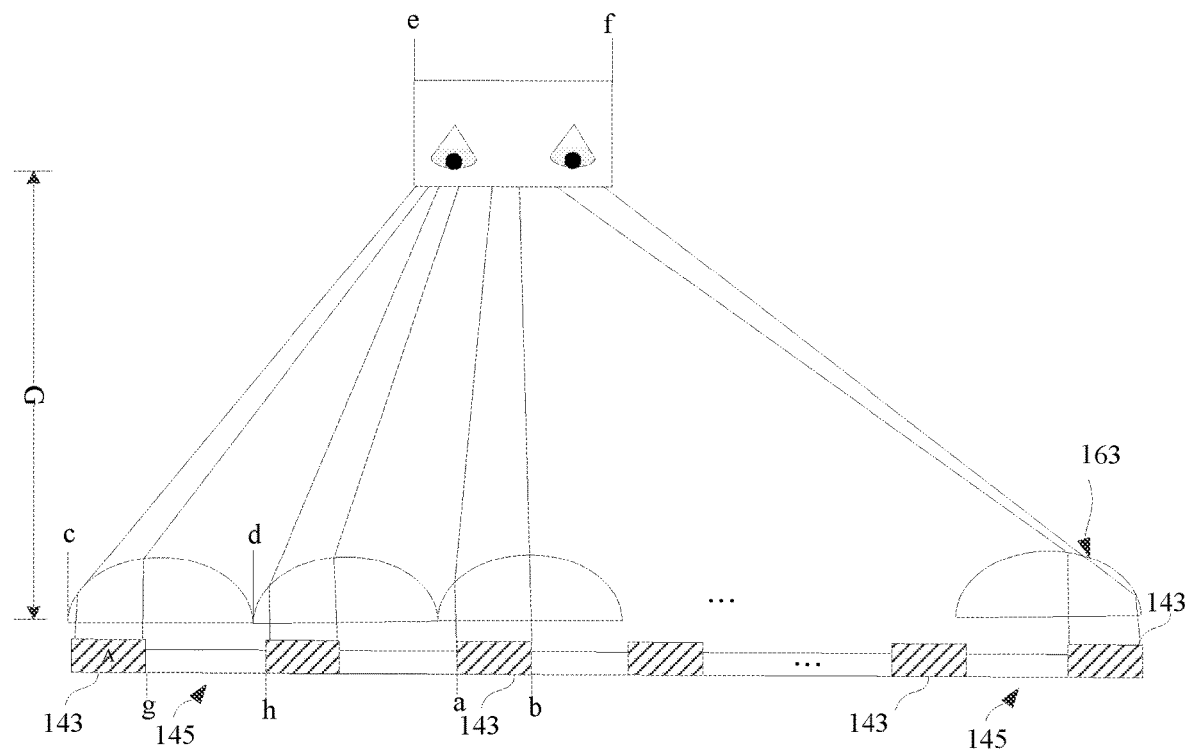
FIG. 5 is a schematic diagram illustrating the display device according to the embodiment as shown in FIG. 1.

Continuing to refer to FIG. 5, the left side of FIG. 5 is assumed to be a first side, and the right side of FIG. 5 is assumed to be a second side opposite to the first side. Each of the display areas 143 has an edge a at its first side and an edge b at its second side. Each of the idle areas 145 has an edge g at its first side and an edge h at its second side. At least one display area 143 and one idle area 145 are correspondingly positioned below each of the elongated lenses 163. Here, each of the elongated lenses 163 has an edge c at its first side and an edge d at its second side. The predetermined visible range has an edge e at its first side and an edge f at its second side.

For each of the display areas 143, the edges thereof meet the following conditions: the display content at the edge a of each display area 143 is projected to the range between the edges e and f through the respective elongated lens 163 having the edges c and d, and the display content at the edge b of each display area 143 is projected to the range between the edges e and f through the respective lens 163 having the edges c and d, thereby ensuring that the display content displayed in each of the display areas 143 are fully visible only in the predetermined visible range. It should be noted that the outmost ones of the display areas 143 may have different configurations from that of FIG. 5. For example, the outmost ones of the display areas 143 may be replaced with idle areas.

Further, since the predetermined visible range is an area visible for the eyes of the user, the width of the predetermined visible range may be determined based on the distance between a pair of human eyes. Generally, the width between the edges e and f may be slightly larger than the distance between a pair of human eyes. That is, the predetermined visible range is a range determined based on the distance between a pair of human eyes. In this way, when a person views the display panel from the above, he or she can only see the display content when his or her eyes are within the predetermined visible range.

In an embodiment, the position of the display area 143 on the display panel 144 is fixed, and the refractive index of each of the lenses 163 is fixed. That is, the predetermined visible range is fixed.

In this case, the display driver 142 is configured to determine the positions of the display areas 143 arranged in parallel with each other and spaced apart from each other on the display panel 144 based on pre-stored position information of the plurality of display areas on the display panel; divide the image frame to obtain the respective portions of the display content for the display areas 143; and drive each of the display areas 143 to display a respective portion of the display content based on the position of the display area.

In another embodiment, the position of the human eyes viewing the display panel is variable and the distance G between the human eyes and the lens film 162 is variable, so that the predetermined visible range is variable.

In this case, the controller 120 is further configured to send a position determining instruction to the display driver 142.

The display driver 142 is configured to determine the positions of the display areas 143 on the display panel 144 based on the position determining instruction; divide the image frame to obtain the respective portions of the display content for the display areas 143; and drive each of the display areas 143 to display a respective portion of the display content based on the positions of the display area. Here, the position determining instruction is configured to indicate the position of each of the display areas 143 on the display panel.

Optionally, the controller 120 determines the position of each of the display areas 143 on the display panel based on the position and the refractive index of each of the lenses 163. The position of each of the lenses 163 includes the width of each of the lenses 163 and the relative position with respect to each other.

Optionally, when the position of the human eyes relative to the display panel varies, the controller 120 dynamically determines the position of each of the display areas 143 in accordance with the conditions illustrated in FIG. 5 based on the distance e-f between the pair of human eyes, the coordinates of the human eyes projecting on the lens film 162, the distance G between the human eyes and the lens film 162, and the position and the refractive index of each of the lenses 163.

The present embodiment does not limit how the controller 120 obtains the distance e-f between the human eyes, the coordinates of the human eyes projecting on the lens film 162, and the distance G between the human eyes and the lens film 162. The control 120 may obtain these parameters by a device such as a front camera, a distance sensor.

Accordingly from the above, the display device provided in the present embodiment includes the controller configured to send an image frame to the display driver; and the display driver configured to drive the display panel to display the image frame in a plurality of display areas arranged in parallel with each other and spaced apart from each other, each of the display areas being configured to display a respective portion of the display content of the image frame, wherein the respective portion of the display content displayed on each of the display areas are projected to a predetermined visible range after being refracted by a corresponding elongated lens. In this way, it may solve the problem in the related art that when the display screen displays with a wide visible angle, it is probable that other persons around the user may catch sight of the contents on the display screen, resulting in privacy leakage for the user, and may achieve the effect that the visible range of the display panel is limited within a predetermined visible range and a person in an area outside the predetermined visible range cannot see or cannot clearly see the image frame on the display panel.

Hereinafter, method embodiments of the present disclosure are described and can be implemented in the device embodiments of the present disclosure. Details not disclosed in the method embodiments of the present disclosure can refer to the device embodiments of the present disclosure.

Figure 6:
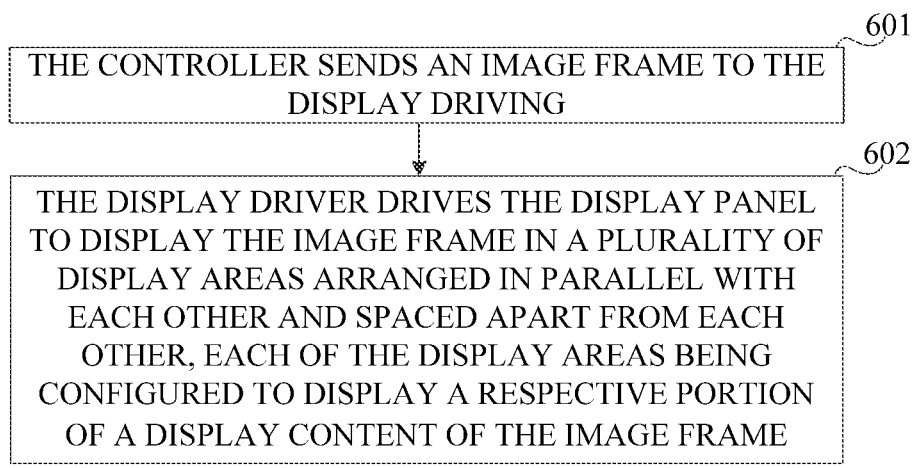
FIG. 6 is a flow chart illustrating a display method according to an exemplary embodiment.

FIG. 6 is a flow chart illustrating a display method according to an exemplary embodiment. The method is applied to a display device in the embodiment illustrated in FIG. 1. The display device includes: a controller, a display driver coupled to the controller, a display panel coupled to the display driver, and a lens film disposed over the display panel. The lens film includes a plurality of elongated lenses arranged in parallel with each other, each of the lenses having a respective refractive index.

The method may include the following steps.

In step 601, the controller sends an image frame to the display driver.

Since a displayed stream usually includes a sequence of separate image frames, the step 601 may be periodically performed for multiple times, or will be performed when the image frame changes.

In step 602, the display driver drives the display panel to display the image frame in a plurality of display areas arranged in parallel with each other and spaced apart from each other, each of the display areas being configured to display a portion of a display content of the image frame.

Here, the respective portion of the display content displayed on each of the display areas are projected to a predetermined visible range after being refracted by a corresponding elongated lens.

Accordingly from the above, the display device provided in the present embodiment includes the controller configured to send an image frame to the display driver; and the display driver configured to drive the display panel to display the image frame in a plurality of display areas arranged in parallel with each other and spaced apart from each other, each of the display areas being configured to display a portion of the display content of the image frame, wherein the respective portion of the display content displayed on each of the display areas is projected to a predetermined visible range after being refracted by a corresponding elongated lens. In this way, it may solve the problem in the related art that when the display screen is operating in a wide visible angle, it is probably that other persons around the user may catch sight of the contents of the display screen, resulting in privacy leakage for the user, and it may achieve the effect that the visible range of the display panel is limited within a predetermined visible range and a person in an area outside the predetermined visible range cannot see or cannot clearly see the image frame on the display panel.

Figure 7:
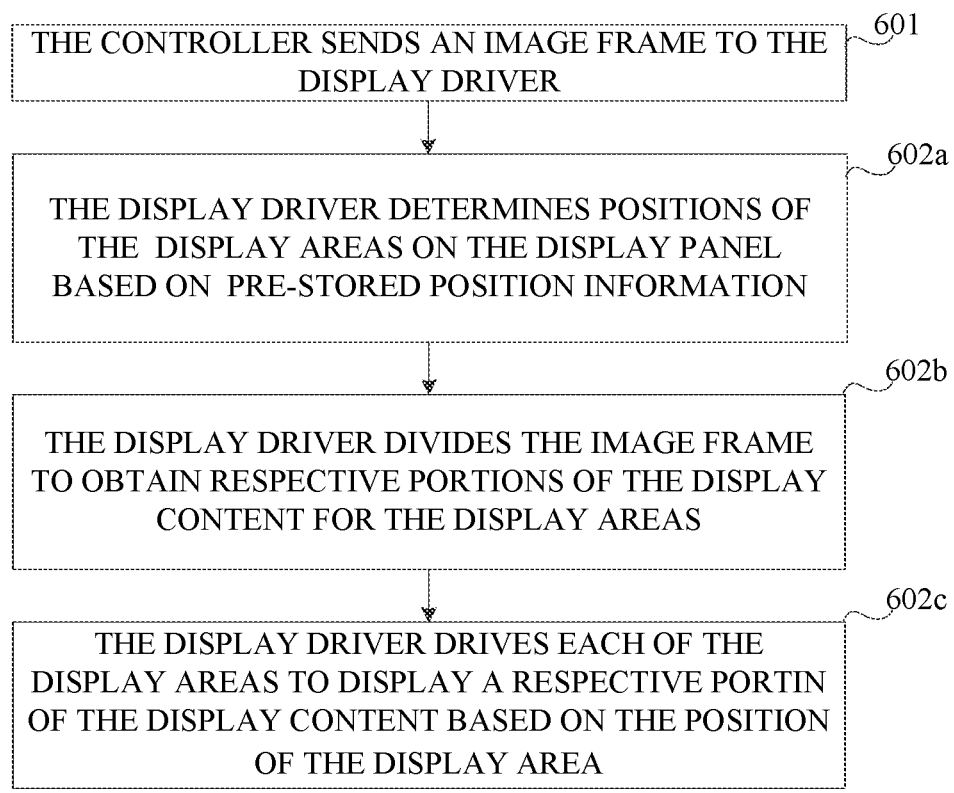
FIG. 7 is a flow chart illustrating a display method according to another exemplary embodiment.

In an optional embodiment provided on the basis of the embodiment shown in FIG. 6, the step 602 may be alternatively implemented as a step 602a, a step 602b and a step 602c, as shown in FIG. 7.

In the step 602a, the display driver determines the positions of the display areas on the display panel based on pre-stored position information of the plurality of display areas.

In the step 602b, the display driver divides the image frame to obtain the respective portions of the display content for the display areas.

In the step 602c, the display driver drives each of the display areas to display a respective portion of the display content based on the position of the display area.

Accordingly from the above, the display device provided in the present embodiment includes a display driver configured to determine the positions of the display areas on the display panel based on pre-stored position information; divide the image frame to obtain the respective portions of the display content for the display areas; and drive each of the display areas to display the respective portion of the display content based on the position of the display area. Since the position information is preset, when the predetermined visible range is fixed, the display driver may determine the position of each of the display areas directly based on the position information, thereby simplifying the operation of the display device.

Figure 8:
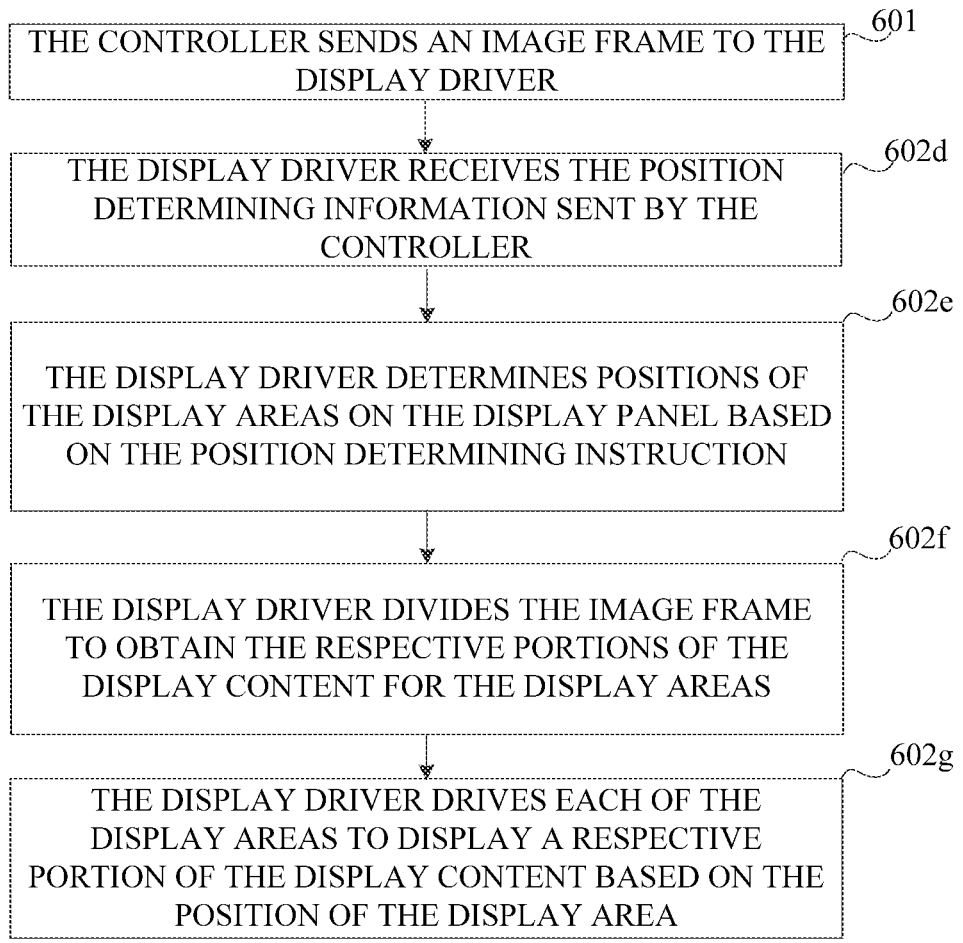
FIG. 8 is a flow chart illustrating a display method according to still another exemplary embodiment.

In another optional embodiment provided on the basis of the embodiment shown in FIG. 6, the controller determines the position of each of the display areas on the display panel based on the position and the refractive index of each of the lenses, and sends a position determining instruction to the display driver, the position determining instruction being configured to indicate the position of each of the display areas. Accordingly, the step 602 may be alternatively implemented as a step 602d, a step 602e, a step 602f and a step 602g, as shown in FIG. 8.

In the step 602d, the display driver receives the position determining information sent by the controller.

In the step 602e, the display driver determines the positions of the display areas on the display panel based on the position determining instruction.

In the step 602f, the display driver divides the image frame to obtain the respective portion of the display content for the display areas.

In the step 602g, the display driver drives each of the display areas to display a respective portion of the display content based on the position of the display area.

Here, the respective display content portions displayed in the display areas are projected to a predetermined visible range after being refracted by the respective elongated lens. Optionally, the predetermined visible range is a range determined based on the distance between a pair of human eyes.

It should be noted that the lens film is detachably affixed onto an upper layer of the display panel. For illustration purpose, if the lens film is affixed onto the upper layer of the display panel, the visible range of the display panel may be limited within a predetermined visible range, such that a person in an area outside the predetermined visible range cannot see or cannot clearly see the image frame on the display panel; and if the lens film is detached from the upper layer of the display panel, the visible range of the display panel is switched to a normal visible range, such that the light corresponding to the display panel is emitted straightly.

Since the lens film is detachable, the display device 100 accordingly has two operating modes: a wide visible angle operating mode and a narrow visible angle operating mode. The display device 100 can be switched between the above-mentioned two operating modes. When the lens film is affixed onto the upper layer of the display panel, the operating state is switched from the wide visible angle operating state to the narrow visible angle operating state; and when the lens film is detached from the upper layer of the display panel, the operating state is switched from the narrow visible angle operating state to the wide visible angle operating state.

It also should be noted that when the operating state is in the narrow visible angle operating state, the display driver drives an idle area between each two adjacent display areas on the display panel to be in an inactive state or drives an idle area between each two adjacent display areas on the display panel to display predetermined pseudo display contents. Here, the pseudo display contents are projected to an area outside the predetermined visible range after being refracted by the elongated lens.

Accordingly from the above, the display device provided in the present embodiment includes the display driver configured to determine the positions of the display areas on the display panel based on the position determining instruction; divide the image frame to obtain the respective portions of the display content for the display areas; and drive each of the display areas to display the respective portion of the display content based on the position of the display area. The position determining instruction is used by the controller to determine the position of each of the display areas on the display panel based on the position and the refractive index of each of the lenses and is sent to the display driver, such that when the predetermined visible range is variable, the display driver can dynamically determine the position of each of the display areas based on the position determining instruction, thereby achieving the effect that each of the display areas can accurately display the respective display contents.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A display device, comprising:
a controller;
a display driver coupled to the controller;
a display panel coupled to the display driver; and
a lens film disposed over the display panel;
wherein the lens film comprises a plurality of elongated lenses arranged in parallel with each other, each of the plurality of elongated lenses having a refractive index;
wherein the controller is configured to send an image frame to the display driver;
wherein the display driver is configured to drive the display panel to display the image frame in a plurality of display areas of the display panel arranged in parallel with each other and spaced apart from each other, each of the plurality of display areas being configured to display a portion of a display content of the image frame;
wherein the display content displayed in the plurality of display areas, after refracted by respective ones of the plurality of elongated lenses, is projected to a predetermined visible range;
wherein the controller is further configured to send a position determining instruction to the display driver, wherein the position determining instruction indicates a position of each of the plurality of display areas on the display panel;
wherein the display driver is configured to determine the positions of the plurality of display areas on the display panel based on the position determining instruction; divide the image frame to obtain the respective portions of the display content for the plurality of display areas; and drive each of the plurality of display areas to display a respective portion of the display content based on the positions of the display area; and
wherein the controller is further configured to determine the positions of the plurality of display areas on the display panel based on the respective positions and refractive indexes of the plurality of elongated lenses.

2. The display device of claim 1, wherein
the display driver is configured to determine positions of the plurality of display areas on the display panel based on pre-stored position information of the plurality of display areas on the display panel, divide the image frame to obtain the respective portions of the display content for the plurality of display areas; and drive each of the plurality of display areas to display a respective portion of the display content based on the position of the display area.

3. The display device of claim 1, wherein
the predetermined visible range is a range determined based on a distance between a pair of human eyes.

4. The display device of claim 1, wherein
the display driver is further configured to drive an idle area between each two adjacent display areas on the display panel in an inactive state.

5. The display device of claim 1, wherein
the display driver is further configured to drive an idle area between each two adjacent display areas on the display panel to display predetermined pseudo display contents, and
the pseudo display contents, after refracted by respective ones of the plurality of elongated lenses at respective predetermined refractive indexes, are projected to an area outside the predetermined visible range.

6. The display device of claim 1, wherein
the lens film is detachably affixed onto an upper layer of the display panel.

7. A display method applied to a display device comprising a controller, a display driver coupled to the controller, a display panel coupled to the display driver, and a lens film disposed over the display panel, the lens film comprising a plurality of elongated lenses arranged in parallel with each other, and each of the plurality of elongated lenses having a refractive index, the display method comprising:
sending an image frame to the display driver by the controller;
driving the display panel to display the image frame in a plurality of display areas arranged in parallel and spaced apart from each other by the display driver, each of the plurality of display areas displaying a portion of a display content of the image frame, wherein the display content displayed in the plurality of display areas, after refracted by respective ones of the plurality of elongated lenses, is projected to a predetermined visible range;

wherein the display method further comprise: sending a position determining instruction to the display driver by the controller, wherein the position determining instruction indicates a position of each of the plurality of display areas on the display panel;

wherein driving the display panel to display the image frame in a plurality of display areas arranged in parallel with each other and spaced apart from each other by the display driver comprises:

determining the positions of the display areas on the display panel based on the position determining instruction by the display driver;

dividing the image frame to obtain the respective portions of the display content for the plurality of display areas by the display driver; and driving each of the plurality of display areas to display a respective portion of display content based on the positions of the display area by the display driver; and wherein the display method further comprises: determining the positions of the plurality of display areas on the display panel based on the respective positions and the refractive indexes of the plurality of elongated lenses by the controller.

8. The display method of claim 7, wherein driving the display panel to display the image frame in a plurality of display areas arranged in parallel with each other and spaced apart from each other by the display driver comprises:

determining positions of the plurality of display areas on the display panel based on pre-stored position information of the plurality of display areas by the display driver;

dividing the image frame to obtain the respective portions of the display content for the plurality of display areas by the display driver; and driving each of the plurality of display areas to display a respective portion of the display content based on the position of the display area by the display driver.

9. The display method of claim 7, wherein the predetermined visible range is a range determined based on a distance between a pair of human eyes.

10. The display method of claim 7, further comprising:

driving an idle area between each two adjacent display areas on the display panel in an inactive state by the display driver.

11. The display method of claim 7, further comprising:

driving an idle area between each two adjacent display areas on the display panel to display predetermined pseudo display contents by the display driver, wherein the pseudo display contents, after refracted by respective ones of the plurality of elongated lenses at respective predetermined refractive indexes, are projected to an area outside the predetermined visible range.

12. The display method of claim 7, wherein the lens film is detachably affixed onto an upper layer of the display panel.

\* \* \* \* \*